US006831270B2

(12) United States Patent
Furuta et al.

(10) Patent No.: US 6,831,270 B2
(45) Date of Patent: Dec. 14, 2004

(54) METHOD FOR PREPARING A SAMPLE FOR USE IN LASER DESORPTION IONIZATION MASS SPECTROMETRY AND SAMPLE PLATE USED IN SUCH A METHOD

(75) Inventors: Masaru Furuta, Kyoto (JP); Nobuhiro Hanafusa, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 10/699,822

(22) Filed: Nov. 4, 2003

(65) Prior Publication Data

US 2004/0104343 A1 Jun. 3, 2004

(30) Foreign Application Priority Data

Nov. 11, 2002 (JP) ....................................... 2002-326665

(51) Int. Cl.[7] .......................... H01J 49/04; B01D 59/44
(52) U.S. Cl. ........................ 250/281; 250/282; 250/288
(58) Field of Search ................................ 250/288, 281, 250/282

(56) References Cited

U.S. PATENT DOCUMENTS 5,808,300 A * 9/1998 Caprioli ...................... 250/288
6,140,639 A * 10/2000 Gusev et al. ............... 250/288
2003/0116707 A1 * 6/2003 Brown et al. ............... 250/288

FOREIGN PATENT DOCUMENTS

JP 10-040858 A1 2/1998
WO WO-98/47006 A1 10/1998

* cited by examiner

*Primary Examiner*—Nikita Wells
(74) *Attorney, Agent, or Firm*—Rader, Fishman & Grauer PLLC

(57) ABSTRACT

A sample plate is provided with a mass-spectrometry-use measuring-sample preparation area which serves as an ionization area used for ionizing the sample through laser irradiation, and a membrane affixing area which serves as a plane area on which the membrane bearing the sample adsorbed thereon is fixedly held. The mass-spectrometry-use measuring-sample preparation area is provided with spots at which the sample, extracted from the membrane fixedly affixed to the membrane affixing area, is dropped together with a matrix solution, and placed, and the spots are preferably regularly arranged thereon. Each of the spots preferably has a round structure surrounded by a groove on the periphery thereof so as to be dried in a converged state without being diffused from a fixed area.

18 Claims, 2 Drawing Sheets

METHOD FOR PREPARING A SAMPLE FOR USE IN LASER DESORPTION IONIZATION MASS SPECTROMETRY AND SAMPLE PLATE USED IN SUCH A METHOD

BACKGROUND OF THE INVENTION

1. Field of the Invention

The present invention relates to a method for analyzing a substance that has been developed over a membrane in a solid phase by using a laser desorption ionization mass spectrometric method in various fields such as clinical, diagnostic, biochemical and molecular biological fields.

2. Description of the Background Art

In order to analyze a mass of molecules to be measured, a laser desorption ionization mass spectrometric method has been used in which a laser beam is applied to a sample placed on a sample plate attached to a mass spectrometer so that the sample is ionized and analyzed (see JP-A No. 10-40858). Upon placing the sample on the sample plate so as to be analyzed, there are two methods, that is, one method in which a matrix is used and the other method in which a matrix is not used.

A method in which the method using a matrix is combined with a time-of-flight mass spectrometer is referred to as MALDI-TOF (matrix-assisted laser desorption ionization time-of-flight) mass spectrometric method.

In the MALDI-TOF method, a measuring sample is dropped onto a metal sample plate together with a matrix solution, and after having been dried, this is subjected to a measuring process. In this case, the sample to be dropped needs to be closely crystallized in a fixed area.

Here, with respect to the measuring sample, a mass spectrometric method has been proposed in which after biomolecules have been separated through electrophoresis or the like, these are transferred onto a membrane in a solid phase, and the solid-phase sample is subjected to various reactions on the membrane by utilizing a trace-amount application technique using a piezoelectric element, and the resulting reaction products are utilized to carry out mass analysis (see International Publication No. WO98/47006).

In the case where the sample, adsorbed on a membrane, is subjected to a mass spectrometric analysis, in comparison with MALDI-TOF measurements directly carded out on the corresponding reaction product on the membrane, it is more preferable to carry out measurements on the sample that has extracted from the membrane, and transferred onto an MALDI-TOF-use sample plate, in order to obtain measured values with higher precision.

Here, in an attempt to provide a device which carries out a sequence of processes of extracting a sample from the membrane, transferring the sample onto a sample plate and forming an MALDI-TOF-use sample plate, two plates (stages) are required. In other words, one plate on which a membrane holding a separated biological sample is fixedly held so that the target molecule adsorption position is recognized so as to apply a reagent and the other sample plate on which the sample extracted from the membrane is placed so as to be introduced to an MALDI-TOF mass spectrometer are required. When these plates are controlled by the same device, two plates or stages need to be placed on the same plane in parallel with each other, causing a limitation in reducing the device size.

The above explanation has exemplified a case in which the sample for use in MALDI-TOF measurements is prepared. However, the same problem arises also in the case where the sample is prepared without using a matrix.

SUMMARY OF THE INVENTION

The object of the present invention is to achieve a process for transferring a sample adsorbed on a membrane to a sample plate for a laser desorption ionization mass spectrometric method by using a small-size device.

In order to achieve the above-mentioned objective, the present invention provides an area used for fixedly holding a membrane bearing a sample adsorbed thereon on a sheet of a sample plate in addition to an area on which a sample used for mass spectrometry is placed.

That is, the sample preparation method of the present invention is a method for preparing a sample to be analyzed on a sample plate for a laser desorption ionization mass spectrometric method which applies a laser beam onto a sample placed on a sample plate attached to a mass spectrometer so that the sample is ionized, and then analyzed, and one portion of areas on the sample plate surface is prepared as an ionization area used for ionizing the sample through irradiation with a laser beam, and another portion on the sample plate surface is prepared as a plane area to which a membrane bearing the sample adsorbed thereon is fixed, and in this method, after the membrane bearing the sample adsorbed thereon has been fixedly held on the above-mentioned plane area, the sample is extracted from the membrane, and the extracted sample is placed on the above-mentioned ionization area so as to prepare an ionization-use sample.

The sample plate of the present invention is a sample plate which is used in a laser desorption ionization mass spectrometer, and attached to a mass spectrometer, with a sample to be analyzed being placed on the surface thereof, so that the sample is ionized through irradiation with a laser beam, and is characterized in that an ionization area which is used for ionizing the sample through irradiation with a laser beam and a plane area to which a membrane bearing the sample adsorbed thereon is fixed are prepared.

As described above, the ionization area used for ionizing the sample and the plane area to which the membrane bearing the sample adsorbed thereon is fixed are installed on the same plate so that it becomes possible to reduce the stage area to be used in the device, and consequently to miniaturize the entire device.

One of the preferable methods for ionization of the sample is a matrix-assisted laser desorption ionization method. In this case, a sample to be placed on the ionization area of the sample plate is prepared by using a matrix.

In one of the preferable examples for the method by which the membrane bearing the sample adsorbed thereon is fixedly held on the plane area of the sample plate, a medium in which the sample is developed is superposed on the membrane, and after the sample has been transferred from the medium onto the membrane by applying a voltage between the medium and the membrane, the membrane is fixedly held to a state in which the membrane is electrically conducted to the sample plate.

In a preferable mode, the ionization area of the sample plate is arranged so that portions on which respective samples are placed are separated from other portion by borders so that the samples are placed in a locally distributed manner. With respect to the borders, for example, grooves each of which surrounds the corresponding sample portion are formed.

Examples of the sample to be adsorbed on the membrane include molecules of proteins, peptides, saccharides, lipids, nucleic acid molecules and the like or a mixture of these molecules that are separated through SDS (sodium dodecyl sulfate) polyacrylamide electrophoresis, two-dimensional electrophoresis in which isoelectric focusing electrophoresis and SDS polyacrylamide electrophoresis are combined, or other chromatography processes.

These samples may be modified by a proteolytic enzyme, a glycolytic enzyme, nuclease or a combination thereof. The sample, modified in such a manner, can be extracted from the membrane by using a solvent The sample thus extracted is dropped onto the ionization area of the sample plate, and placed thereon.

With respect to the material of a membrane to be used for solid-phase deposition of a sample, examples thereof include PVDF (polyvinylidene difluoride), nitrocellulose, nylon (registered trademark) or derivatives thereof.

The present invention eliminates the necessity of separately preparing the membrane-fixing-use plate and the mass-measuring-use plate, thereby making it possible to cut costs required for the analysis, to reduce the area occupied by the respective plates in the device, and consequently to miniaturize the device.

Moreover, the sample plate may of course be used as a simple general-use mass spectrometry sample plate, and may be applied to a method for directly carrying out a mass spectrometric analysis of a sample adsorbed on a membrane; therefore, it is possible to provide a method in which one sheet of plate can be applied to many kinds of analyses.

DESCRIPTION OF THE PREFERRED EMBODIMENT

Figure 1A:
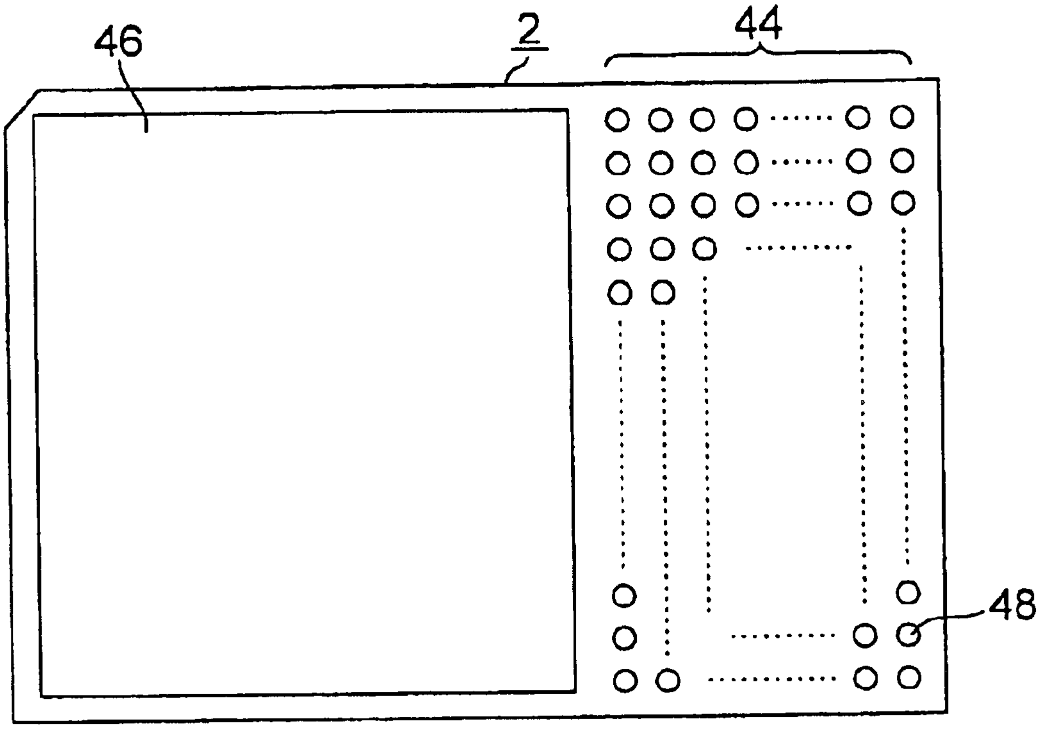
FIG. 1(A) is a plan view that shows a sample plate in accordance with one embodiment.
Figure 1B:
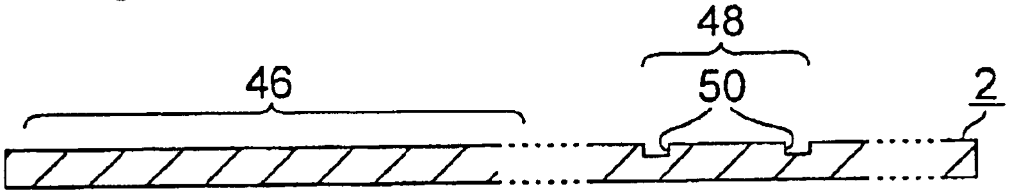
FIG. 1(B) is a partially enlarged cross-sectional view that shows a lateral cross-section of the sample plate of FIG. 1(A).

FIG. 1(A) is a plan view that shows a sample plate in accordance with one embodiment, and FIG. 1(B) is a partially enlarged cross-sectional view that shows a lateral cross-section of the sample plate of FIG. 1(A).

The sample plate 2 is formed by a metal plate made of stainless steel, and provided with a mass-spectrometry-use measuring-sample preparation area 44 which serves as an ionization area used for ionizing the sample through irradiation with a laser beam, and a membrane affixing area 46 which serves as a plane area on which the membrane bearing the sample adsorbed thereon is fixedly held.

Of these, the mass-spectrometry-use measuring-sample preparation area 44 is provided with spots 48 at which the sample, extracted from the membrane fixedly affixed to the membrane affixing area 46, is dropped together with a matrix solution, and placed, and the spots 48 are regularly arranged thereon. As shown in FIG. 1(B) as an enlarged cross-sectional view, each of the spots 48 has a round structure surrounded by a groove 50 on the periphery thereof so as to be dried in a converged state without being diffused from a fixed area.

Since the membrane needs to be closely made in contact with a metal plate over the entire surface of the membrane affixing area 46, the membrane affixing area 46 forms a complete plane. The membrane is fixedly held onto this area by utilizing a conductive double-sided tape or the like.

The membrane affixing area 46 may be prepared as a flat plate; however, by preparing frames shown in the figure as concave and convex portions or a painted area, the frames may be utilized as guide lines used for fixedly holding the membrane so that it becomes possible to improve the workability of the membrane-fixing operations.

The sample, prepared by using the sample plate of the present invention, is analyzed by a laser desorption ionization mass spectrometer. The laser desorption ionization mass spectrometer is provided with an ionization chamber in which only the sample or a mixture of the sample and a matrix is placed as an analyzing object, a laser irradiation optical system which ionizes the sample by applying laser light to the analyzing object, and a mass spectrometry unit which extracts and separates the ionized sample ions, and analyzes the ions in accordance with mass number. In the laser desorption ionization mass spectrometer, a laser beam, such as a nitrogen gas laser (wavelength: 337 nm), an Nd-YAG laser (wavelength: 266 nm or 355 nm) and a carbon dioxide gas laser (wavelength: 1060 nm, 2.94 $\mu$m), is applied to the analyzing object so that the sample is ionized, and the ionized sample is directed to the mass spectrometry unit, and analyzed therein. This analyzing method makes it possible to converge the laser light to a diameter of as small as several $\mu$m; therefore, public attention has been focused on this method with respect to its capability of analyzing a minute portion.

In the case where the analyzing object is limited to only the sample, the sample itself absorbs the laser light to directly obtain energy from the laser light, and is ionized. In the case where a matrix is used, the matrix absorbs the laser light to convert it to thermal energy, and one portion of the matrix is rapidly heated to evaporate together with the sample. In this case, even when the sample molecules are desorbed in the neutral state, if protons or cations (that exist as impurities) that are simultaneously evaporated or matrix ions are added to the sample molecules, sample ions are formed. The laser beam is preferably applied as a pulse laser beam of approximately 1 nano second.

With respect to the sample preparation in the case of using a matrix, after mixing a sample solution and a matrix solution at a molar ratio of 1:100 to 1:10000, the resulting mixture is dried to obtain a state in which both of the solutions are uniformly mixed in the level of micron. As a result, a crystalline state or an amorphous state in which fine crystals of the sample are surrounded by a great amount of matrix crystals is formed. In general, this analyzing object contains cations or anions which are preliminarily added or impurities.

In the case where a matrix is used, various kinds of matrixes can be used depending on the kind of substances to be analyzed, and examples thereof include nicotinic acid, 2-pyrazine carboxylic acid, sinapic acid, 2,5-dihydroxy benzoic acid, 5-methoxy salicylic acid, $\alpha$-cyano-4-hydroxy cinnamic acid, 3-hydroxy picolic acid, diamino naphthalene, 2-(4-hydroxyphenylazo) benzoic acid, dithranol, succinic acid, 5-(trifluoromethyl) uracil and glycerin (see "Bunseki" No. 4, pp.253 to 261 (1996)).

With respect to the mass spectrometry unit used for laser desorption ionization mass spectrometry, a time-of-flight mass spectrometer (TOFMS) is used; however, other spectrometers, such as a Fourier transform-type ion cyclotron resonance mass spectrometer (FTMS), a double convergence-type mass spectrometer (double focus MS) which selects ions and directs the resulting ions to the detector by using a magnetic field and an electric field, a three dimensional quadruple-pole type ion trap mass spectrometer or the like, may also be used.

In the case where the laser desorption ionization and the time-of-flight mass spectrometer are combined with each other, with respect to the molecular weight, even immunoglobulin M (average molecular weight 900 kDa) can be detected, and it is said that the detection limit has reached the amol level. The compounds that can be ionized include a wide range of compounds such as general bio-related substances including peptides, proteins, polysaccharides, complex lipids and nucleic acid related substances, synthetic polymers, oligomers, metal coordination compounds and inorganic compounds.

Figure 2:
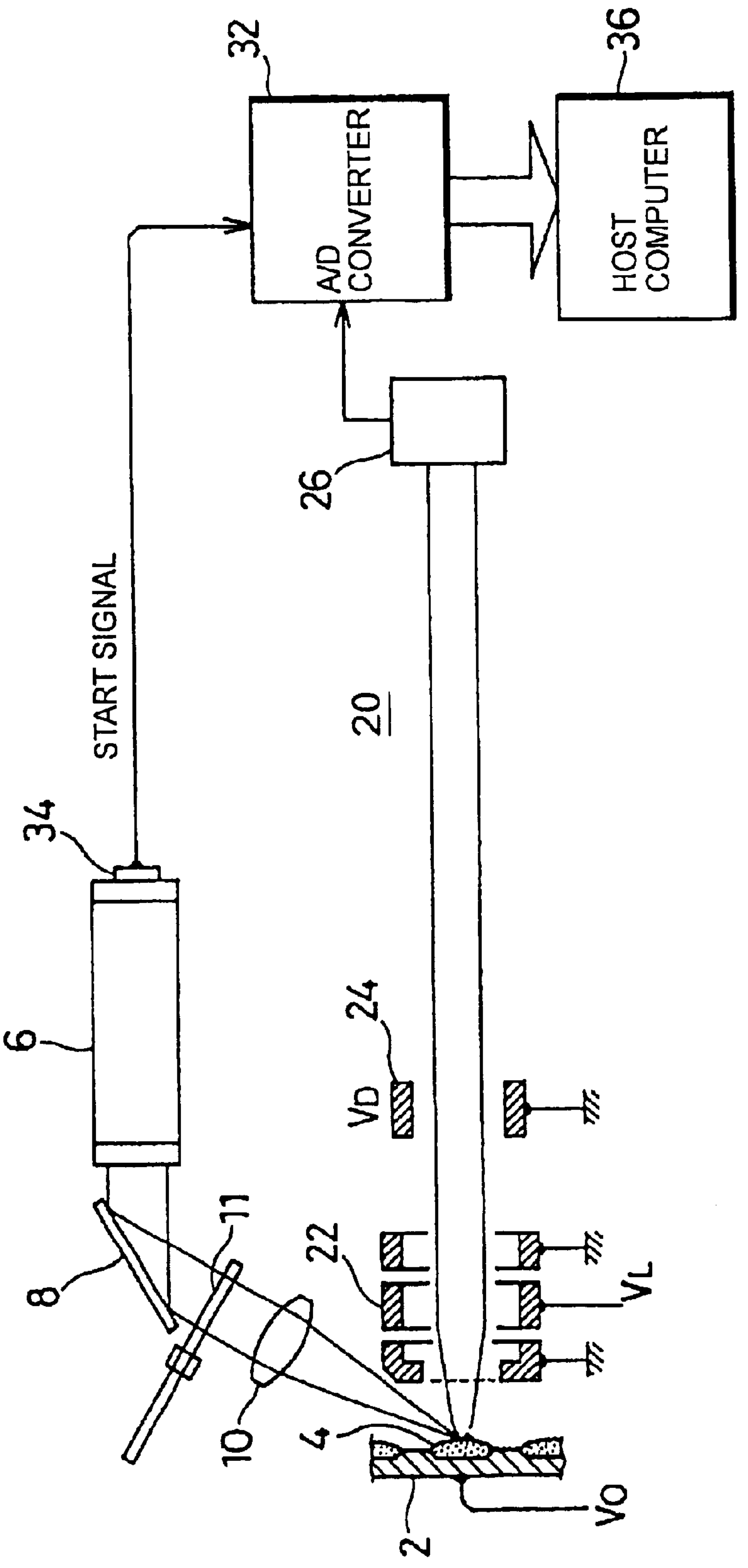
FIG. 2 is a schematic structural drawing that shows one example of a MALDI-TOF mass spectrometer.

FIG. 2 shows one example of the MALDI-TOF mass spectrometer.

An analyzing object 4, placed on a sample plate 2, is put in an ionization chamber. In this case, it is supposed that the analyzing object 4 is a mixture of a sample and a matrix. In order to converge a laser beam from a nitrogen laser (wavelength: 337 nm) 6 used for ionizing the sample onto the analyzing object 4 so as to be irradiated, a mirror 8, an optical lens 10 which converges a laser beam that is bent by the mirror 8 and an optical filter 11 that eliminates unnecessary high harmonic waves and the like of the laser light are installed.

A time-of-flight mass spectrometer is installed as a mass spectrometry unit for analyzing the sample ions that have been subjected to an ionizing process. The mass spectrometer is provided with an ion lens 22 that approaches the analyzing object 4 so as to extract ions, a deflection plate 24 which directs the ions extracted through the ion lens 22 toward the detector or in a direction deviated from the direction of the detector, and a detector 26 on which the ions that have passed through the deflection plate 24 are made incident and detected.

An ion detection signal, outputted from the detector 26, is directed to an AD converter 32. In the time-of-flight mass spectrometer, in order to determine the origin (zero point) of time from which time-of-flight is measured, a photodiode 34 is placed in the nitrogen laser 6, and a detection signal of the photodiode 34 is directed to the AD converter 32 as a start signal. The AD converter 32 converts the signal from the detector 26 to a digital signal by using the start signal as the origin of time. Reference numeral 36 represents a host computer which receives the detector signal converted to the digital signal by the AD converter 32, and carries out data processing thereon, as well as controlling the operations of the entire spectrometer.

Next, the following description will discuss the operations of this MALDI-TOF mass spectrometer.

A laser beam is adjusted by a filter 11, converged by the lens 10, and applied to the analyzing object 4 so as to be ionized. The sample ions, thus generated, are extracted by a voltage Vo applied to the sample plate 2 and a ground potential on the analyzing object side of the ion lens 22, and the extracted ions are allowed to fly in a parallel path by a voltage VL applied to the ion lens located on the next stage. When the potential VD of the deflection plate 24 is set to the ground potential, the ions are allowed to linearly fly to reach the detector 26 and detected thereby.

When a potential VD is applied to the deflection plate 24, the ion flow is bent, and no longer reaches the detector 26.

After having been detected and amplified by the detector 26, the ions are converted to digital signals by the AD converter 32 with the laser oscillation time point serving as the time-of-flight origin, and directed to the host computer 36 so as to be analyzed.

The laser 6 is installed at an external portion of a vacuum system of the analyzing unit 20, and the laser beam is introduced through a light-introducing window of the vacuum system.

What is claimed is:

1. A sample preparation method for preparing a sample to be analyzed on a sample plate for a laser desorption ionization mass spectrometric method which applies a laser beam onto the sample placed on the sample plate attached to a mass spectrometer so that the sample is ionized, the sample plate having one portion of areas on the sample plate surface as an ionization area used for ionizing the sample through laser irradiation, and another portion on the sample plate surface being prepared as a plane area to which a membrane bearing the sample adsorbed thereon is fixed, comprising the steps of:

fixedly holding the membrane bearing the sample adsorbed thereon on the plane area;

extracting a sample from the membrane that has been fixedly held; and placing the extracted sample on the ionization area.

2. The sample preparation method according to claim 1, wherein the method for ionization of the sample is a matrix-assisted laser desorption ionization method, and the sample to be placed on the ionization area is formed by using a matrix.

3. The sample preparation method according to claim 1, wherein in the step of fixedly holding the membrane bearing the sample adsorbed to the plane area, a medium in which the sample is developed is superposed on the membrane so that, after the sample has been transferred from the medium to the membrane by applying a voltage between the medium and membrane, the membrane is fixedly held in a state in which the membrane is electrically conducted to the sample plate.

4. The sample preparation method according to claim 1, wherein the sample, which is adsorbed on the membrane, is at least one material selected from the group consisting of proteins, peptides, saccharides, lipids, nucleic acid molecules and a mixture thereof.

5. The sample preparation method according to claim 4, wherein the sample is separated by a method selected from the group consisting of two-dimensional electrophoresis in which isoelectric focusing electrophoresis and SDS polyacrylamide electrophoresis are combined, SDS polyacrylamide electrophoresis and other chromatography methods.

6. The sample preparation method according to claim 1, wherein prior to extracting the sample from the membrane, the sample adsorbed on the membrane is modified.

7. The sample preparation method according to claim 6, wherein the modifying reaction is a reaction caused by at least one enzyme selected from the group consisting of proteolytic enzyme, glycolytic enzyme, nuclease and a combination thereof.

8. The sample preparation method according to claim 1, wherein the membrane is at least one polymer selected from the group consisting of PVDF, nitrocellulose, nylon (registered trademark) and derivatives thereof.

9. A sample plate, which is attached to, and used in a laser desorption ionization mass spectrometer, with a sample to be analyzed being placed on the surface thereof, so that the sample is ionized through irradiation with a laser beam, comprising:

an ionization area which is used for ionizing the sample through laser irradiation to the surface thereof; and a plane area to which a membrane bearing the sample adsorbed thereon is fixed.

10. The sample plate according to claim 9, wherein the membrane is at least one polymer selected from the group consisting of PVDF, nitrocellulose, nylon (registered trademark) and derivatives thereof.

11. The sample plate according to claim 9, wherein in the ionization area, portions on which respective samples are placed are separated from the other portions by borders so that the samples are placed in a locally distributed manner.

12. The sample plate according to claim 11, wherein, with respect to the borders, grooves each of which surrounds the corresponding sample placed portion are formed.

13. A sample plate, comprising:

a sample plate body having a working surface, the working surface including a membrane affixing region and an ionization region disposed in a juxtaposed manner relative to each other, wherein the ionization region includes at least one groove formed in an endless loop into the working surface to define a spot area disposed on the working surface.

14. A sample plate according to claim 13, wherein the ionization region includes a plurality of endless loop grooves formed into the working surface defining a plurality of spot areas disposed on the working surface.

15. A sample plate according to claim 14, wherein the plurality of endless loop grooves are arranged in a matrix structure forming a plurality of spot areas aligned in a series of columns and rows.

16. A sample plate according to claim 13, wherein respective ones of the spot areas in each column are linearly aligned and respective ones of the spot areas in each row are linearly aligned.

17. A sample plate according to claim 13, wherein the membrane affixing region is generally rectangularly shaped and the ionization region is generally rectangularly shaped.

18. A sample plate according to claim 17, wherein the membrane affixing region and the ionization region constitute at least substantially the entire working surface.

* * * * *